United States Patent
Kubo

(10) Patent No.: US 10,469,019 B2
(45) Date of Patent: Nov. 5, 2019

(54) MOTOR CONTROL SYSTEM, MOTOR CONTROL APPARATUS, METHOD FOR CONTROLLING MOTOR, AND STATE ESTIMATOR

(71) Applicant: Kabushiki Kaisha Yaskawa Denki, Kitakyushu-shi (JP)

(72) Inventor: Tsutomu Kubo, Kitakyushu (JP)

(73) Assignee: KABUSHIKI KAISHA YASKAWA DENKI, Kitakyushu-shi (JP)

(*) Notice: Subject to any disclaimer, the term of this patent is extended or adjusted under 35 U.S.C. 154(b) by 116 days.

(21) Appl. No.: 15/712,391

(22) Filed: Sep. 22, 2017

(65) Prior Publication Data

US 2018/0278197 A1 Sep. 27, 2018

(30) Foreign Application Priority Data

Mar. 27, 2017 (JP) ................. 2017-061711

(51) Int. Cl.
*H02P 29/60* (2016.01)
*H02P 29/032* (2016.01)
*G06N 3/08* (2006.01)

(52) U.S. Cl.
CPC ............ *H02P 29/60* (2016.02); *H02P 29/032* (2016.02); *G05B 2219/37375* (2013.01); *G06N 3/084* (2013.01); *H02P 2201/03* (2013.01); *H02P 2205/00* (2013.01)

(58) Field of Classification Search
CPC . G05B 5/00; G05D 23/00; H02H 7/08; H02P 1/00; H02P 1/04; H02P 1/46; H02P 3/18; H02P 21/00; H02P 27/04; H02P 27/06; H02P 23/00; H02P 27/00; H02P 6/00; G01K 17/00; G01P 5/10; G01P 13/006
USPC ..... 318/471, 472, 400.01, 400.02, 700, 701, 318/727, 779, 799, 800, 801, 430, 432, 318/437; 361/23, 30; 363/40, 44, 120, 363/174, 175
See application file for complete search history.

(56) References Cited

U.S. PATENT DOCUMENTS

| 4,667,480 | A | * | 5/1987 | Bessler | ................ | B60H 1/3205 |
| | | | | | | 318/254.1 |
| 5,708,336 | A | * | 1/1998 | Eyerly | ................. | H02H 7/0852 |
| | | | | | | 318/436 |
| 8,368,336 | B2 | * | 2/2013 | Kozarekar | ............. | B60L 1/003 |
| | | | | | | 318/471 |

FOREIGN PATENT DOCUMENTS

JP 2008-017602 A 1/2008

* cited by examiner

*Primary Examiner* — Antony M Paul
(74) *Attorney, Agent, or Firm* — Oblon, McClelland, Maier & Neustadt, L.L.P.

(57) ABSTRACT

A motor control system includes a motor control apparatus, a motor, an environment state detector, and an operation state monitor. The motor control apparatus is configured to control feeding of driving power based on a control command. The motor is drivable by the driving power. The environment state detector is configured to detect environment state data of at least one of the motor control apparatus and the motor. The operation state monitor is configured to output, based on the environment state data, an operation margin of an operation state value of the at least one of the motor control apparatus and the motor relative to an operation rated value of the at least one of the motor control apparatus and the motor.

20 Claims, 7 Drawing Sheets

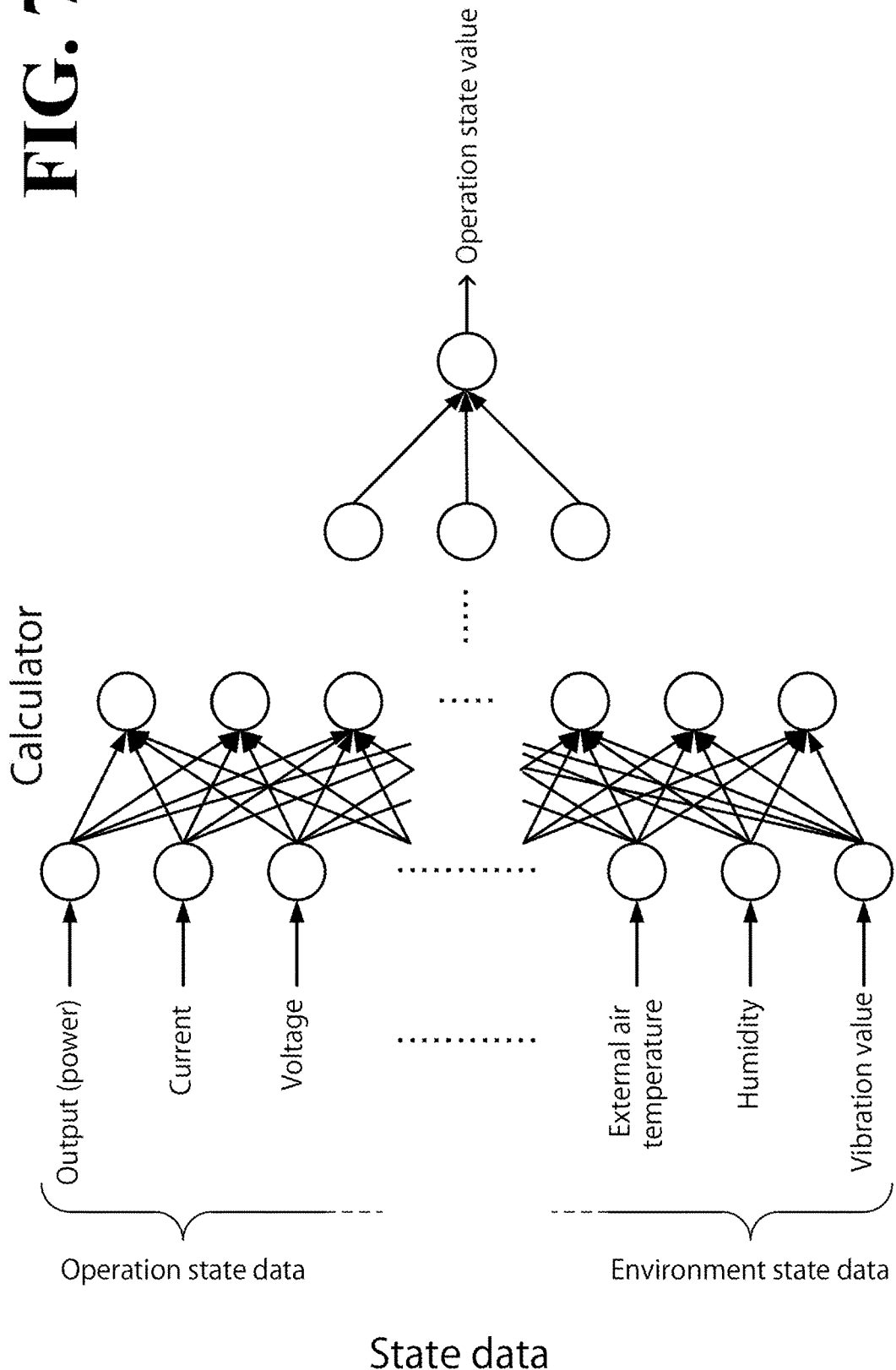

MOTOR CONTROL SYSTEM, MOTOR CONTROL APPARATUS, METHOD FOR CONTROLLING MOTOR, AND STATE ESTIMATOR

CROSS-REFERENCE TO RELATED APPLICATIONS

The present application claims priority under 35 U.S.C. § 119 to Japanese Patent Application No. 2017-061711, filed Mar. 27, 2017. The contents of this application are incorporated herein by reference in their entirety.

BACKGROUND OF THE INVENTION

Field of the Invention

The embodiments disclosed herein relate to a motor control system, a motor control apparatus, a method for controlling a motor, and a state estimator.

Description of Background Art

JP2008-17602A1 discloses comparing a detected output current with a corresponding rated value and comparing an intake air temperature with a corresponding rated value to determine whether these operation states are in application environment conditions that secure a predetermined lifetime for an appliance.

SUMMARY OF THE INVENTION

According to one aspect of the present disclosure, a motor control system includes a motor, a motor control apparatus including circuitry that controls feeding of driving power to the motor based on a control command, an environmental state sensor that detects environmental state data of the motor control apparatus and/or the motor, and operation state circuitry that determines, based on the environmental state data, an operation margin for an operation state value of at least one of the motor control apparatus and the motor, the operation margin being relative to an operation rated value of at least one of the motor control apparatus and the motor, and to output the determined operation margin.

According to another aspect of the present disclosure, an apparatus includes circuitry that obtains environmental state data from an environmental state sensor that detects environmental state data of a motor control apparatus, determine, based on the obtained environmental state data, an operation margin of an operation state value for the motor control apparatus, the operation margin being relative to an operation rated value of the motor control apparatus, and output the operation margin to the motor control apparatus such that the motor control apparatus, based on a control command, controls driving power fed to a motor.

According to yet another aspect of the present disclosure, a method for controlling a motor includes detecting environmental state data of a motor control apparatus, determining, based on the environmental state data, an operation margin of an operation state value for the motor control apparatus, the operation margin being relative to an operation rated value of the motor control apparatus, and outputting the operation margin to the motor control apparatus such that the motor control apparatus, based on a control command, controls driving power fed to the motor.

According to still another aspect of the present disclosure, a state estimator includes an operation state monitor. The operation state monitor is configured to, based on environment state data of a target appliance, output an operation margin of an operation state value of the target appliance relative to an operation rated value of the target appliance.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 7 illustrates a schematic model configuration of a deep-learning neural network of a calculator.

DETAILED DESCRIPTION OF THE EMBODIMENTS

Figure 1:
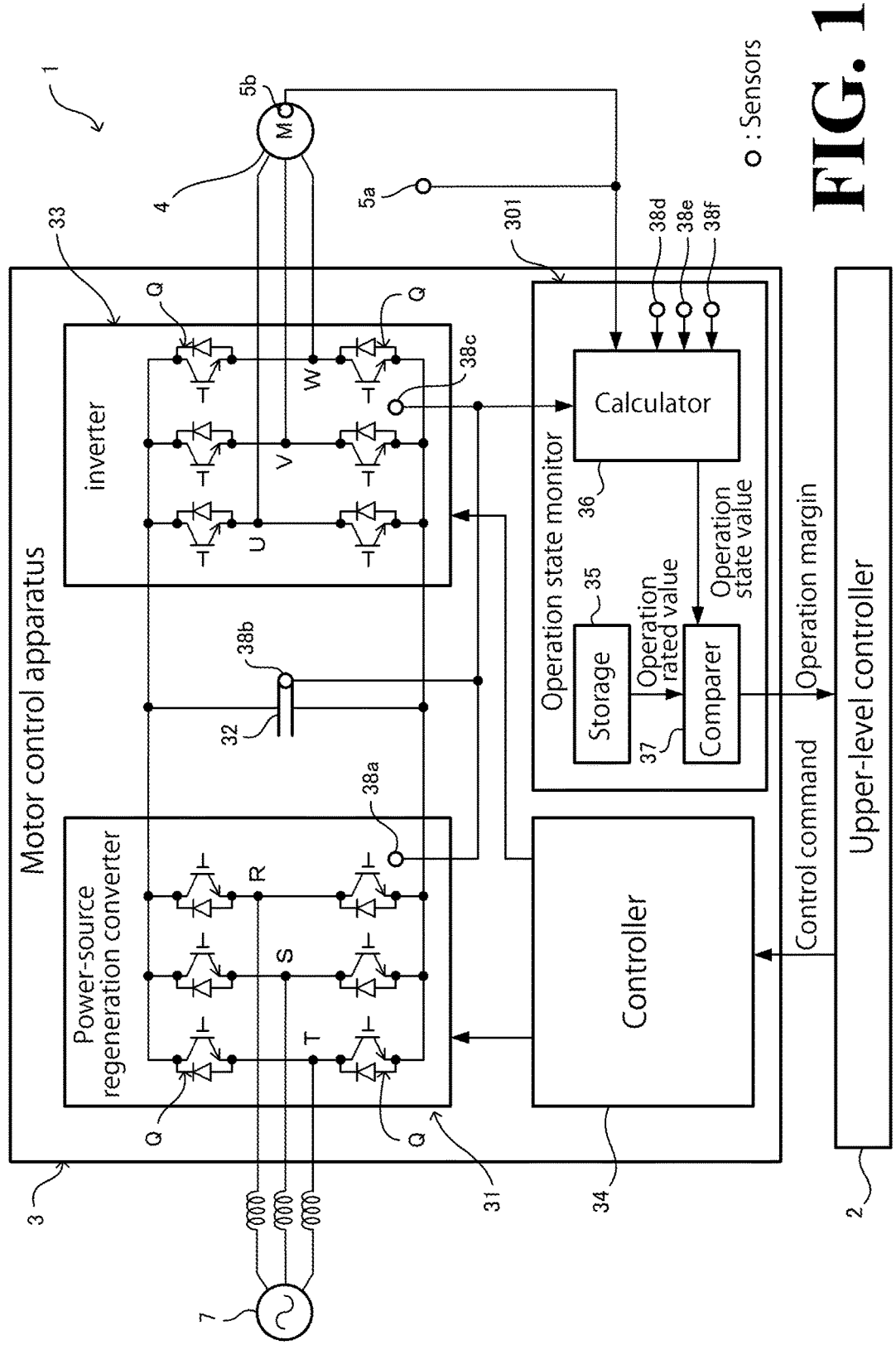
FIG. 1 is a diagram illustrating an exemplary system block configuration of a motor control system according to an embodiment.

Embodiments will now be described with reference to the accompanying drawings, wherein like reference numerals designate corresponding or identical elements throughout the various drawings.

Schematic Configuration of Motor Control System

By referring to FIG. 1, a system block configuration of a motor control system 1 according to this embodiment will be described. As illustrated in FIG. 1, the motor control system 1 includes an upper-level controller 2, a motor control apparatus 3, a motor 4, and various external sensors 5.

The upper-level controller 2 is a computer made up of CPU, ROM, RAM, and other elements, and refers to information (such as operation margin, described later) input from the motor control apparatus 3 to output a control command to the motor control apparatus 3. In this manner, the upper-level controller 2 controls overall operation of the motor control system 1.

The motor control apparatus 3, based on the control command input from the upper-level controller 2, controls driving power fed to the motor 4. The motor control apparatus 3 includes a power-source regeneration converter 31, a smoothing capacitor 32, an inverter 33, a controller 34, an operation state monitor 301, and various internal sensors 38.

The power-source regeneration converter 31 is connected to a three-phase alternating current (AC) power source 7, which is a commercial power source. The power-source regeneration converter 31 has a function to convert alternating current (AC) power supplied from the three-phase AC power source 7 into direct-current (DC) power and to feed the DC power to a direct-current (DC) bus line; and a regeneration function to convert the DC power through the DC bus line into AC power and to send the AC power to the three-phase AC power source 7. A non-limiting example of the power-source regeneration converter 31 is a device that includes six bridge-connected arm switching elements Q.

The six aim switching elements Q are power semiconductors such as insulated gate bipolar transistor (IGBT), metal-oxide-semiconductor field-effect transistor (MOSFET), and high electron mobility transistor (HEMT). On the side of the three-phase AC power source 7, the power-source regeneration converter 31 is connected to the three phases RST of the three-phase AC power source 7, while on the DC side, the power-source regeneration converter 31 is connected to a DC bus line. It will be understood that the power-source regeneration converter 7 may be replaced with any other AC-to-DC converter such as a diode rectification converter (not illustrated).

The smoothing capacitor 32 is disposed along the DC bus line to smoothen DC power resulting from full-wave rectification at the power-source regeneration converter 31.

The inverter 33 is connected to the motor 4, and has a function to perform PWM conversion of the DC power supplied from the DC bus line into driving power corresponding to three phases of AC each having a predetermined amplitude and a predetermined frequency and to feed the driving power to the motor 4; and a regeneration function to convert AC regeneration power input from the motor 4 into DC power and to send the DC power to the DC bus line. Similarly to the power-source regeneration converter 31, a non-limiting example of the inverter 33 is a device that includes six bridge-connected aim switching elements Q. The six arm switching elements Q are power semiconductors such as insulated gate bipolar transistor (IGBT), metal-oxide-semiconductor field-effect transistor (MOSFET), and high electron mobility transistor (HEMT). On the DC side, the inverter 33 is connected to the DC bus line, while on the side of the motor 4, the inverter 33 is connected to the UVW phases of the motor 4.

The controller 34 is a computer made up of CPU, ROM, RAM, and other elements. Based on the control command input from the upper-level controller 2, the controller 34 generates and outputs ON/OFF control signals to the arm switching elements Q of the power-source regeneration converter 31 and the arm switching elements Q of the inverter 33.

The operation state monitor 301 outputs, based on environment state data described later, an operation margin of an operation state value of at least one of the motor control apparatus 3 and the motor 4 relative to an operation rated value of the at least one of the motor control apparatus 3 and the motor 4. The operation state monitor 301 includes a storage 35, a calculator 36, and a comparer 37.

The storage 35 stores operation rated values calculated in advance for the motor control apparatus 3 and the motor 4, to which the motor control apparatus 3 is connected. The storage 35 may be implemented by a part of the storage area of ROM, RAM, or other storage device of the controller 34 or may be implemented by a dedicated storage device.

The calculator 36 calculates operation state values based on various kinds of environment state data obtained at the internal sensors 38 and the external sensors 5. The calculator 36 may be implemented by software executed by the controller 34 or may be implemented by a dedicated hardware operational circuit.

The comparer 37 compares an operation rated value stored in the storage 35 with an operation state value calculated by the calculator 36 to calculate an operation margin, and outputs the operation margin to the upper-level controller 2. Similarly to the calculator 36, the comparer 37 may be implemented by software executed by the controller 34 or may be implemented by a dedicated hardware operational circuit.

The environment state data, the operation rated value, the operation state value, and the operation margin will be detailed later.

In this embodiment, the internal sensors 38 are provided inside the motor control apparatus 3, and the external sensors 5 are provided outside the motor control apparatus 3. The internal sensors 38 and the external sensors 5 are sensors that obtain various kinds of environment state data input into the calculator 36 of the operation state monitor 301 (these sensors are non-limiting examples of the environment state detector recited in the appended claims). In the embodiment illustrated in FIG. 1, the internal sensors 38 of the motor control apparatus 3 include a converter temperature sensor 38a, a smoothing capacitor temperature sensor 38b, an inverter temperature sensor 38c, an internal atmosphere temperature sensor 38d, a humidity sensor 38e, and a vibration sensor 38f. The external sensors 5 include an external air temperature sensor 5a and a motor temperature sensor 5b.

The environment state data obtained by the converter temperature sensor 38a is component temperature of the power-source regeneration converter 31. The environment state data obtained by the smoothing capacitor temperature sensor 38b is component temperature of the smoothing capacitor 32. The environment state data obtained by the inverter temperature sensor 38c is component temperature of the inverter 33. The environment state data obtained by the internal atmosphere temperature sensor 38d is atmosphere temperature of the inside of the motor control apparatus 3. The environment state data obtained by the humidity sensor 38e is humidity of the inside of the motor control apparatus 3. The environment state data obtained by the vibration sensor 38f is vibration value of the inside of the motor control apparatus 3. The environment state data obtained by the motor temperature sensor 5b is temperature of the motor 4 itself. The environment state data obtained by the external air temperature sensor 5a is external air temperature of the atmosphere surrounding the motor control system 1.

Features of this Embodiment

Today, many of the industrial machinery found in factories, plants, and other industrial facilities, as well as many other types of machinery, are motor-driven such that the motor, when fed power, generates mechanical driving force to drive the machinery. The motor control system 1 according to this embodiment is an exemplary motor control system to control the driving of the motor, and includes the upper-level controller 2, the motor control apparatus 3, and the motor 4.

The motor control system 1 finds applications in a wide variety of working environments and involves various kinds of control with respect to the motor 4. In controlling the motor 4, it is necessary to avoid overusing the motor 4 in excess of its durability, which can cause operation abnormality of the motor 4. In order to eliminate or minimize operation abnormality of the motor 4, the appliance controlled by the motor 4 has various rated values (index values) that are set in advance based on specifications of the appliance. Each of the rated values is set for a different state variable that can affect the normality of the state of the appliance, such as operation state and environment state. Examples of the operation state include, but are not limited to, speed, torque, driving power (current) of the motor 4. Examples of the environment state include, but are not limited to, temperature, humidity, and vibration. Conventionally, each of these rated values has been detemiined with a predetermined design margin (safety factor) added relative to ratings of the components of the appliance or the motor control system 1.

However, in the actual use of the appliance, it has been impossible or difficult to know the appliance's internal environment states (such as component temperature and internal atmosphere temperature) at the present point of time, and this has made it impossible or difficult to determine the degree of usage (margin) of each of the plurality of operation states (such as output current and output torque) relative to the respective rated values (such as rated current and rated torque). This is a major factor that has put restrictions on potential durability of the appliance and/or the motor control system 1.

This embodiment takes this situation into consideration and employs the operation state monitor 301 to output, based on the environment state data, an operation margin of an operation state value of at least one of the motor control apparatus 3 and the motor 4 relative to an operation rated value of the at least one of the motor control apparatus 3 and the motor 4. This configuration enables the user of the motor control system 1 and enables the upper-level controller 2 to adjust, based on the operation margin output from the operation state monitor 301, the balance between the operation control of the appliance and the application environment in which the appliance is used. This, as a result, enables the motor control system 1 as a whole to keep in normal state while making the best use of its potential resources.

Rated Values

Figure 2:
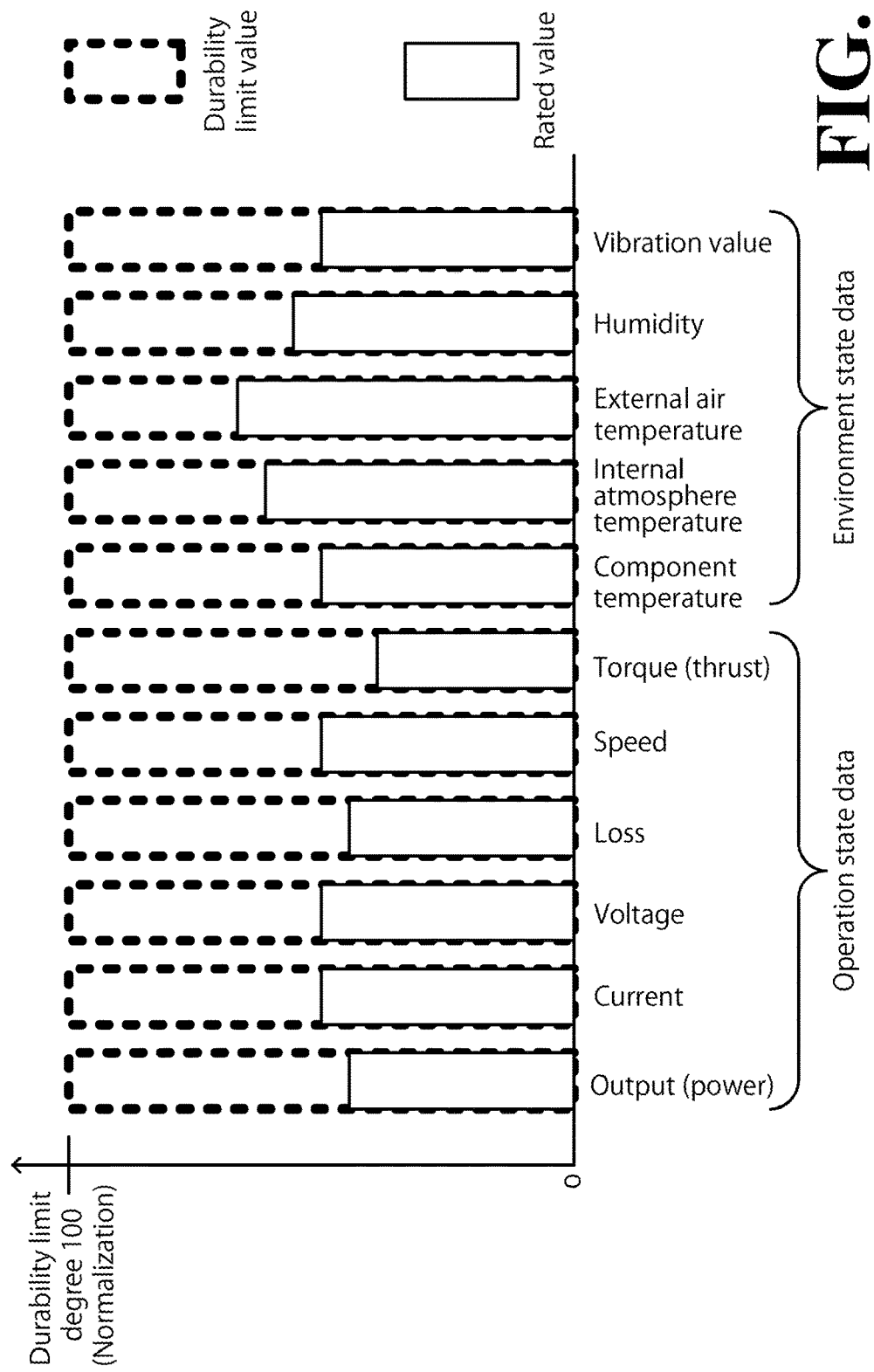
FIG. 2 illustrates an exemplary relationship between durability limit value and rated value of pieces of state data and environment data detected by the motor control system.

Rated values will be described in more detail below by referring to the drawings. FIG. 2 illustrates an exemplary relationship between durability limit value and rated value of pieces of state data and environment data (state variable) detected by the motor control system 1. The pieces of environment state data illustrated in FIG. 2 are state data detected by the internal sensors 38 and the external sensors 5, and the pieces of operation illustrated in FIG. 2 are state data based on corresponding commands generated in the controller 34. As used herein, the "durability limit value" of each piece of state data (see the frame defined by broken bold lines in FIG. 2) is a value determined based on a component of the motor control apparatus 3 and/or the motor 4. Even though the each piece of state data may be increased, the durability limit value may under no circumstances be exceeded; otherwise, not all the components of the motor control apparatus 3 and/or the motor 4 can maintain normal state.

In FIG. 2, the durability limit values of the pieces of state data are normalized to the same 100 percent (%) scale (aligned to the same height as illustrated in FIG. 2). With this normalization done, the ratio of the rated value of each piece of state data to the durability limit value is represented in the form of a bar graph. As used herein, the "rated value" refers to a value with a predetermined design margin (safety factor) added relative to each component rating, and refers to a reference specifications value such that if the corresponding state data is within the rated value range, normal operation of the appliance is secured.

Each piece of state data is normalize in the range from the lower limit value to the upper limit value. To avoid complicated illustration, the component temperatures of the components are collected into one piece of environment state data. The pieces of operation state data, namely, output (power), current, voltage, loss, speed, and torque (thrust) vary from control state to control state of the motor control system 1. The pieces of environment state data, namely, component temperature, internal temperature (internal atmosphere temperature), external air temperature, humidity, and vibration value affect the appliances of the motor control system 1.

As seen from FIG. 2, the rated value corresponding to each piece of state data is set at a low value leaving a great margin relative to the corresponding durability limit value. Securing a great margin is because each piece of state data is allowed to exceed the rated value depending on the latest state of the environment but is not allowed to exceed the durability limit value.

Securing a great margin is also because of a trade-off relationship found between the pieces of state data. For example, in one possible case, the motor control system 1 may be able to maintain its normal state if one piece of state data is sufficiently lower than the corresponding rated value while another piece of state data is higher than the corresponding rated value to some degree. In another possible case, if both pieces of state data exceed the corresponding rated values, an abnormality may occur in the motor control system 1. Thus, even though the substantial durability limit value may be high in each piece of state data, it is necessary to set the rated value at a value low enough to secure a great margin.

In the actual use of the appliance, it has been impossible or difficult to know the appliance's internal environment states (such as component temperature and internal atmosphere temperature) at the present point of time, and this has made it impossible or difficult to determine the degree of usage (margin) of each of the plurality of operation states (such as output current and output torque) relative to the respective rated values (such as rated current and rated torque). This is a major factor that has put restrictions on potential durability of the appliance and/or the motor control system 1.

Operation Rated Value, Operation State Value, Operation Margin

Figure 3:
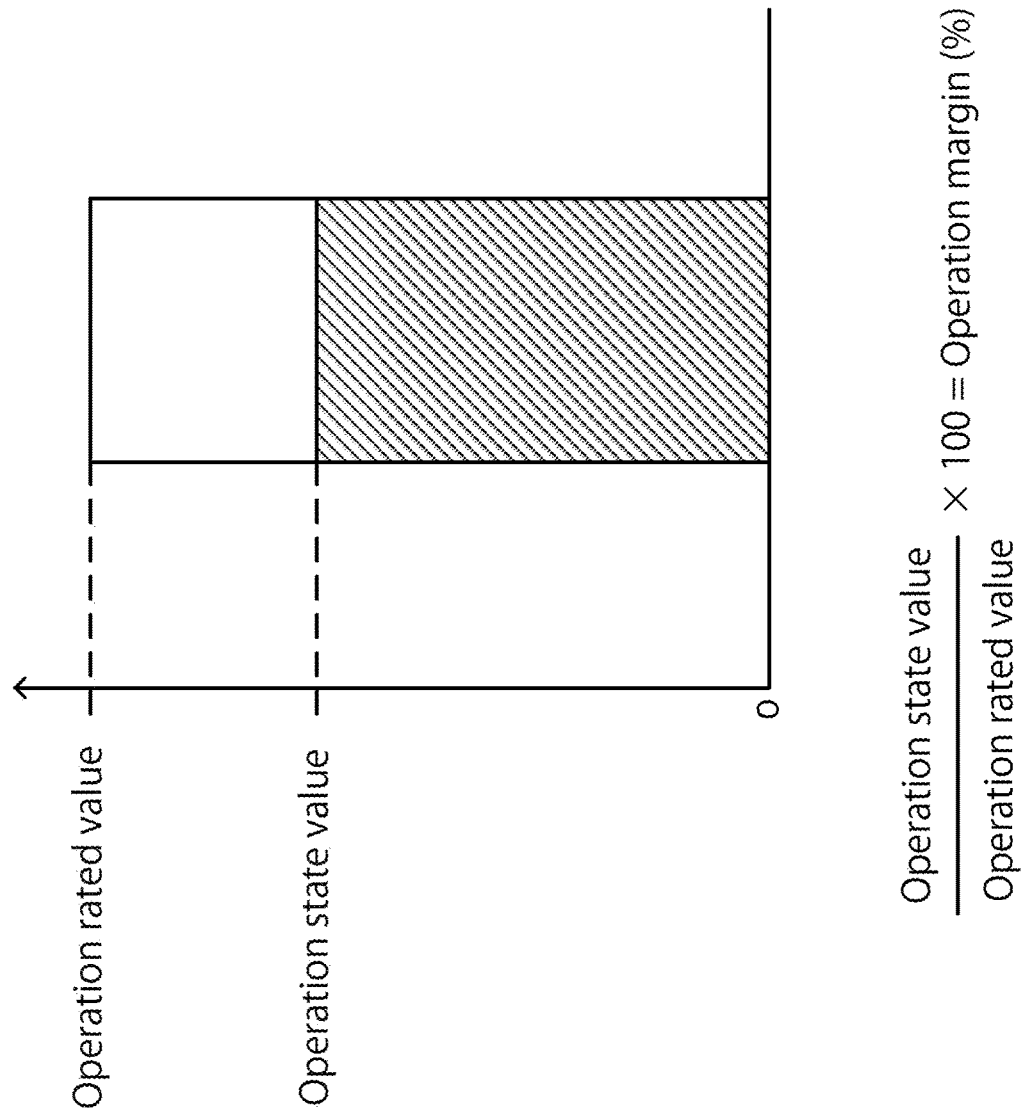
FIG. 3 illustrates a relationship between operation rated value and operation state value.

In this embodiment, rated values respectively corresponding to a plurality pieces of operation state data are combined into an operation rated value, and the plurality pieces of operation state data are combined into an operation state value. The operation state monitor 301 outputs an operation margin based on the environment state data obtained at the present point of time. The operation margin serves an indicator of the degree of appliance usage of the operation state value at this point of time relative to the operation rated value, which is for the purpose of maintaining the normal state of the appliance and the motor control system 1 (see FIG. 3).

The operation rated value is an index value that secures the normal state of at least one of the motor control apparatus 3 and the motor 4. Such operation rated value may be calculated and set statistically based on, for example: durability limit values of the pieces of state data actually measured in a practical test of the motor control system 1; weighting assigned to each durability limit value and set according to the degree of influence that the each durability limit value has on the normal state of the motor control system 1 as a whole; and the above-described trade-off relationship and other correlations.

In this embodiment, the operation state value calculated by the calculator 36 is a value that indicates the degree of influence that all the detected pieces of state data have on the normal state of the motor control system 1 as a whole. More specifically, the operation state value is an index value that indicates, based on the state data obtained at the operation time (driving time) of the motor control system 1 and using a scale of measurement identical to the scale of measurement of the operation rated value, the degree of load applied to the motor control system 1 as of the time of detection of the state data. That is, the operation state value is equivalent to a combination of the individual pieces of operation state data. When the operation state value is equivalent to or less than the operation rated value, the normal state of the entirety of the motor control system 1 in operation state is maintained. When the operation state value is in excess of the operation rated value, the normal state of the motor control system 1 in operation state is not secured (that is, there is a possibility of an abnormality).

Such operation state value may be a variable calculated statistically based on, for example: pieces of state data actually measured in a practical test of the motor control system 1; weighting assigned to each piece of state data and set according to the degree of influence that the each piece of state data has on the normal state of the motor control system 1 as a whole; and the above-described trade-off relationship and other correlations.

In this embodiment, the operation margin output from the comparer 37 is a value that indicates a ratio of the operation state value to the operation rated value. In this embodiment, the comparer 37 calculates the operation margin as a percentage (%), by dividing the operation state value by the operation rated value and multiplying the quotient by 100. In this respect, with a safety factor taken into consideration, a predetermined margin may be subtracted from the operation rated value. With the above-described configuration, the operation state monitor 301 outputs, based on the environment state data, an operation margin of an operation state value of at least one of the motor control apparatus 3 and the motor 4 relative to an operation rated value of the at least one of the motor control apparatus 3 and the motor 4. The operation margin is input into the upper-level controller 2, enabling the upper-level controller 2 to perform control based on the operation margin, that is, take into consideration the margin of the operation state and the environment state of the motor control system 1 at the present point of time. Additionally, the operation margin may be indicated on a display device, and this enables the user of the motor control system 1 to perform control operation and/or make a change to the environment while taking the margin into consideration.

As used herein, the "normal state" of the motor control system 1 as a whole may be defined as a state in which the motor control system 1 is able to operate normally (that is, operate as the control command specifies) or as a state in which the motor control system 1 operates while avoiding exceeding a specified lifetime.

Advantageous Effects of this Embodiment

As has been described hereinbefore, the motor control system 1 according to this embodiment includes the operation state monitor 301. The operation state monitor 301 outputs, based on the environment state data, an operation margin of an operation state value of at least one of the motor control apparatus 3 and the motor 4 relative to an operation rated value of the at least one of the motor control apparatus 3 and the motor 4. This configuration enables the user of the motor control system 1 and enables the upper-level controller 2 to adjust, based on the operation margin output from the operation state monitor 301, the balance between the operation control of the appliance and the application environment in which the appliance is used. This, as a result, enables the motor control system 1 as a whole to keep in normal state while making the best use of its potential resources. This, as a result, improves substantial durability of the motor control system 1. Being able to know the operation margin improves the tact with which the appliance operates such that the appliance can be used at or higher than the operation rated value when the operation margin is relatively high. Being able to know the operation margin is also advantageous in that the volume of the motor control apparatus 3 can be reduced relative to the motor 4, resulting in reduction in size and cost of the motor control apparatus 3.

Also in this embodiment, the operation state monitor 301 includes the storage 35, the calculator 36, and the comparer 37. The storage 35 stores the operation rated values of the motor control apparatus 3 and the motor 4. The calculator 36 calculates an operation state value based on environment state data. The comparer 37 compares an operation rated value with an operation state value to output an operation margin. This configuration enables the user of the motor control system 1 and enables the upper-level controller 2 to adjust, based on the operation margin, the balance between the operation control and the application environment. This, as a result, enables the motor control system 1 as a whole to keep in normal state while making the best use of its potential resources.

In this embodiment, the index values set and calculated for the motor control system 1 as a whole include the operation rated value, the operation state value, and the operation margin. This configuration, however, is not intended in a limiting sense. In another possible embodiment, the operation rated value, the operation state value, and the operation margin are set and calculated on an individual-appliance basis. In this case, the balance between the operation control and the operating environment can be adjusted on an individual-appliance basis.

Also in this embodiment, the operation rated value is an index value that secures the normal state of the motor control apparatus 3 and the motor 4. This configuration enables the user of the motor control system 1 and enables the upper-level controller 2 to more readily adjust the balance between the operation control and the operating environment based on the set operation rated value, that is, while preventing the set operation rated value from being exceeded. When, in particular, the operation margin is relatively high, the appliance can be used at or higher than the operation rated value.

Also in this embodiment, the operation state value is an index value that indicates, based on the environment data and using a scale of measurement identical to the scale of measurement of the operation rated value, the degree of load applied to the motor control system 1 as of the time of detection of the environment data. More specifically, the substantial load applied to the motor control system 1 as a whole at the present point of time is used as an operation state value that can be referred to as an index value in terms of the same scale of measurement as the scale of measurement of the operation rated value. This configuration enables the user of the motor control system 1 and enables the upper-level controller 2 to maintain the normal state of the motor control system 1 as a whole by adjusting the balance between the operation control and the operating environment while preventing the operation state value from exceeding the operation rated value. When, in particular, the operation margin is relatively high, the appliance can be used at or higher than the operation rated value.

Also in this embodiment, the operation margin is a ratio of the operation state value to the operation rated value. Expressing the operation margin as a ratio enables the user of the motor control system 1 and enables the upper-level controller 2 to more readily know the degree of margin of the operation state value at the present point of time relative to the operation rated value. For example, in such an operating environment that the component temperature and the internal atmosphere temperature are sufficiently lower than the corresponding operation rated values, the corresponding operation margins are higher, enabling the appliance to be used at or higher than the operation rated value.

Also in this embodiment, the motor control apparatus 3 includes the operation state monitor 301. This configuration ensures that the number of the operation rated values to be stored in the storage 35 is the same as the number of types of the motor 4 applicable in combination with the motor control apparatus 3. This configuration, as a result, simplifies the setting and selection of the operation rated values. It will be understood that the storage 35, the calculator 36, and the comparer 37 may be provided collectively in the upper-level controller 2, provided separately in the upper-level controller 2 and the motor control apparatus 3, or provided collectively in an independent state estimator. When the storage 35 is provided in the upper-level controller 2 or the state estimator, it is necessary for the storage 35 to store operation rated values set for combinations of applicable types of the motor control apparatus 3 and applicable types of the motor 4.

Also in this embodiment, the environment state data includes at least one of component temperature, external air temperature, internal atmosphere temperature, humidity, and vibration value. This configuration ensures that specific index values are calculated based on pieces of environment state data that affect the appliances of the motor control system 1.

Modifications

Modifications will be described below.

Index Values Set by Machine Learning

In the above-described embodiment, the operation rated value and the operation state value are set and calculated by a statistical method. This configuration, however, is not intended in a limiting sense. Another possible example is to set and calculate these index values by machine learning.

Among a wide variety of types of machine learning applicable to setting and calculating the index values, this modification is directed to deep learning applied to a machine learning algorithm More specifically, a boundary curve by which normal operation and abnormal operation are distinguishable from each other is obtained in a state data space of the motor control system 1 (or the appliance), and the index values are obtained based on the boundary curve. This method will be described in more detail below.

Operation State Determined by Machine Learning

Figure 4:
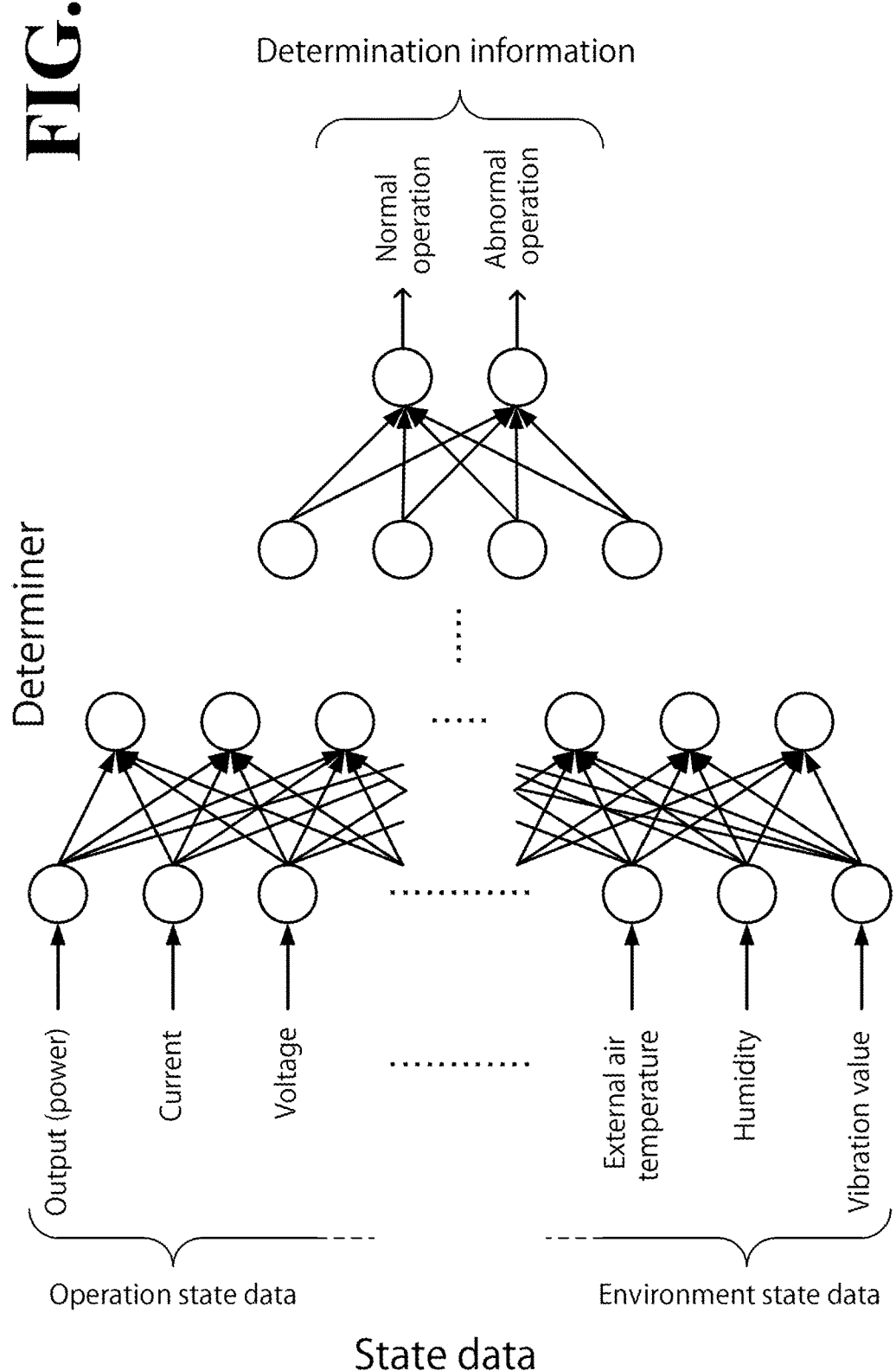
FIG. 4 illustrates a schematic model configuration of a deep-learning neural network of a determiner.

FIG. 4 illustrates a schematic model configuration of a deep-learning neural network of a determiner, which determines normality of the operation state of the motor control system 1. The determiner is a processing unit used to obtain operation rated values in a practical test of the motor control system 1 actually prepared in the design stage, and is provided in the upper-level controller 2 according to the above-described embodiment, the motor control apparatus 3 according to the above-described embodiment, or another independent processing unit (state estimator) capable of obtaining state data. Referring to FIG. 4, the neural network of the determiner is designed to analyze a large number of pieces of state data (operation state data, environment state data) input from the sensors 5 and 38 to determine whether the operation state of the motor control system 1 (or the target appliance) as of the time of detection of each of the state data is normal or abnormal. Then, the neural network outputs the determination as determination information.

In the embodiment illustrated in FIG. 4, each piece of state data is input into an input node, and the value of one of two output nodes corresponding to the two operation states, namely, normal operation and abnormal operation is output as true value in the form of a binary value (what is called clustering output). The determination processings in the neural network of the determiner are based on a learning content learned in the machine learning process in the learning phase of the determiner. Specifically, the learning content learned in the machine learning process includes feature quantities each indicating a correlation (correspondence) between a piece of state data and an operation state.

Figure 5:
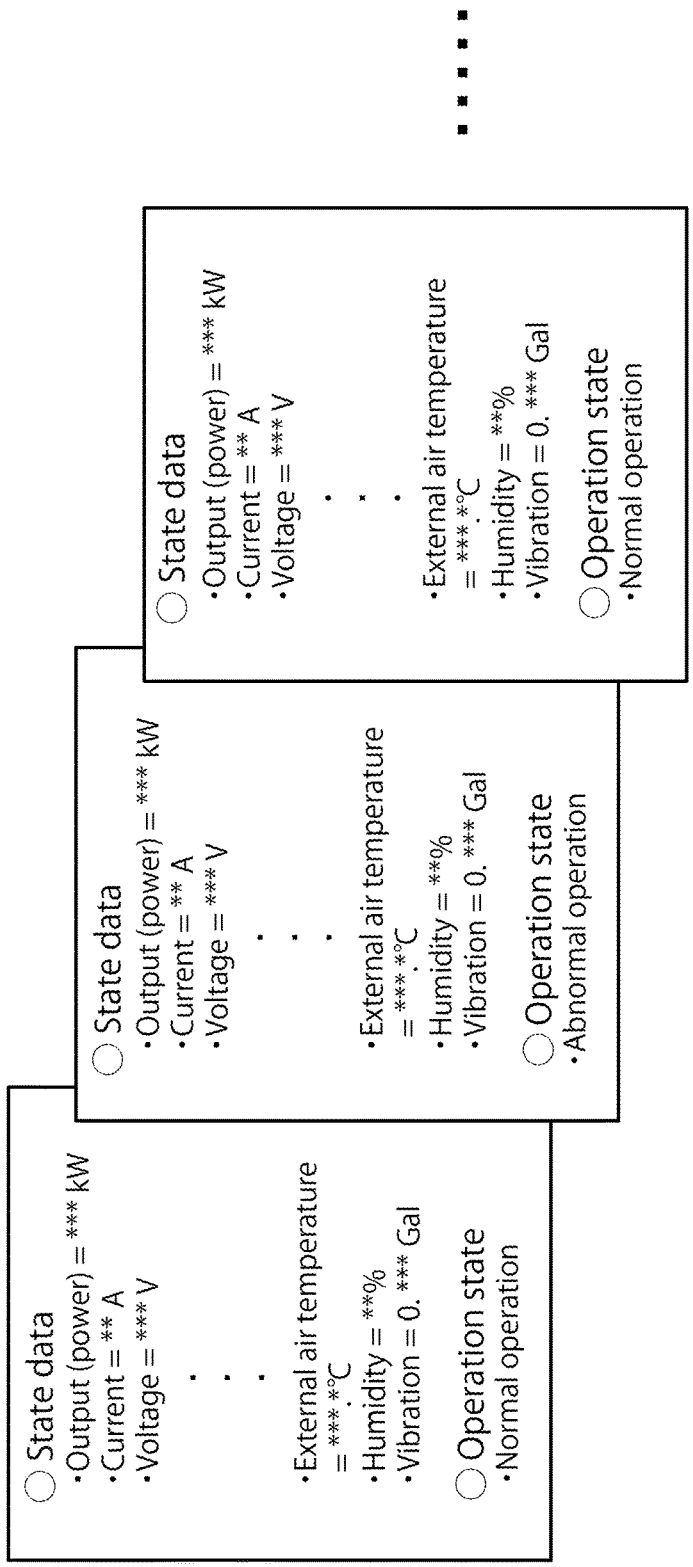
FIG. 5 illustrates determiner-learning data sets.

The multi-layer neural network with the above-described design is mounted in the above-described processing unit in the form of software (or hardware). After the multi-layer neural network has been mounted, the machine learning process of the determiner is implemented by what is called supervised learning using a large number of determiner-learning data sets stored in a database, not illustrated. The determiner-learning data sets used in this modification are as illustrated in FIG. 5. Each determiner-learning data set is prepared by correlating detection values of each piece of state data with an actual operation state of the motor control system 1 (or the target appliance). The actual operation state is as of the detection time of the each piece of state data and determined by the user or in predetermined actual determination processing. Such determiner-learning data set is prepared for various combinations of state data, resulting in a large number of determiner-learning data sets stored in the database.

In the learning phase of the determiner according to this modification, training data consisting of combinations of input data and output data is used. The input data is the state data contained in the determiner-learning data set, while the output data is the operation state contained in the determiner-learning data set. Using the training data, the learning is implemented by processings including what is called backpropagation processing (backwards propagation of errors). The backpropagation processing involves adjusting weight coefficients of the edges connecting the nodes to each other so as to establish relationships between the input layer and the output layer of the neural network of the determiner. It will be understood that a wide variety of other known learning methods may be employed in addition to the backpropagation so as to improve processing accuracy. Examples of the other known learning methods include, but are not limited to, processing using what is called a stacked autoencoder, processing using a restricted Boltzmann machine, dropout processing, noise addition processing, and sparse regularization.

As described above, the algorithm used in the determiner to determine the operation state will not be limited to the above-described algorithm to which deep learning is applied. Other possible examples include, but are not limited to, a machine learning algorithm using a support vector machine and a machine learning algorithm using a Bayesian network. In cases where any of these machine learning algorithms are used, the basic configuration of the neural network of the determiner remains approximately the same. That is, state data is input, the operation state of the motor control system 1 (or the target appliance) resulting from the state data is determined, and the determination is output as determination information.

Example of How to Calculate Index Values Using Operation State Boundary Curve

Figure 6:
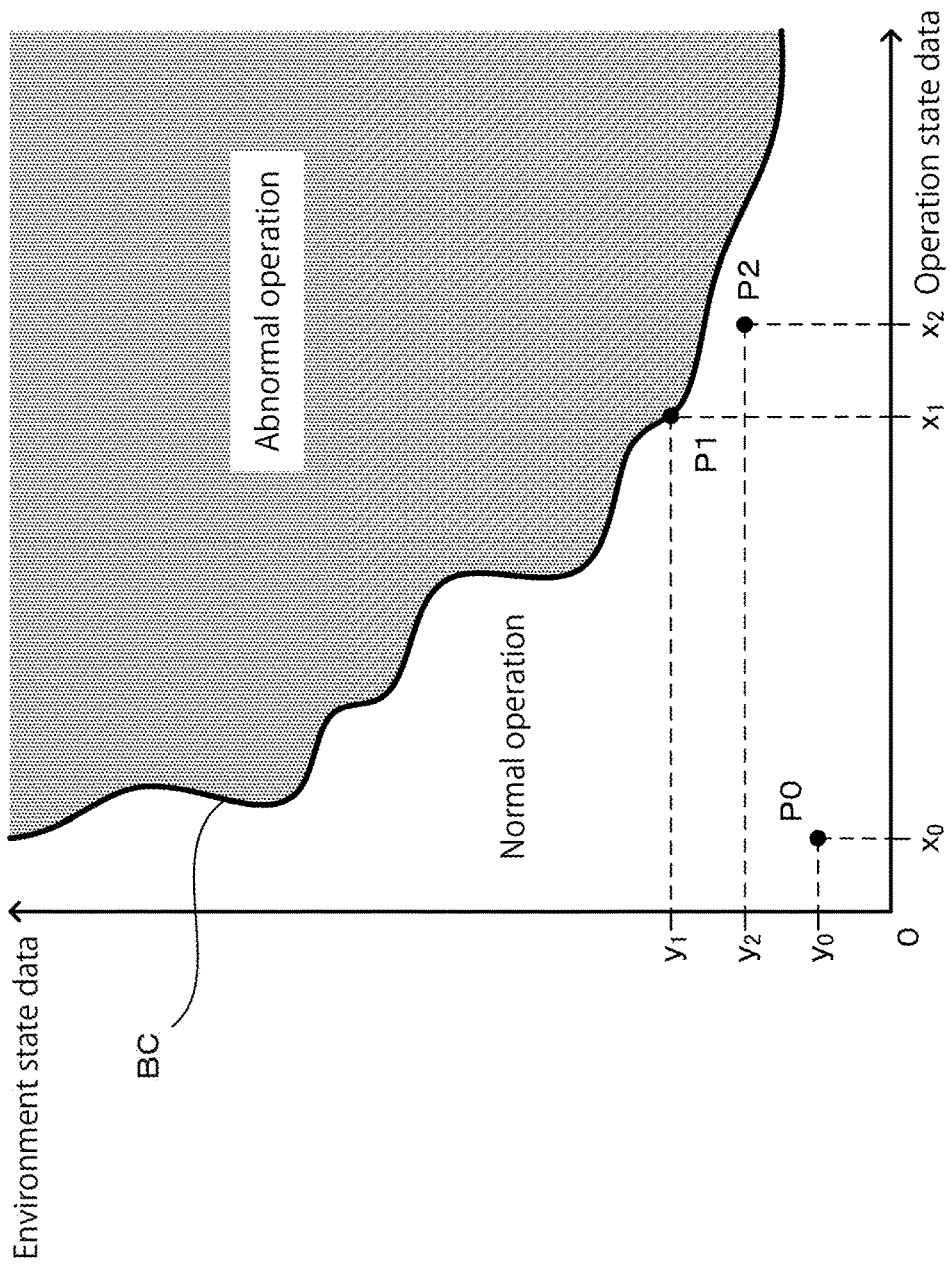
FIG. 6 illustrates a boundary curve in a vector space of state data and illustrates how to calculate index values based on the boundary curve.

The determiner obtained by the above-described machine learning process is capable of forming a boundary curve (curved surface) in a multi-dimensional vector space of the large number of pieces of state data. The boundary curve is a boundary between normal operation region and abnormal operation region of an operation state unique to the motor control system 1 (or the target appliance). An example of the boundary curve, BC, is illustrated in FIG. 6. For ease of illustration, the dimensionality of the vector space is reduced to two dimensions to illustrate a two-dimensional plane consisting of the operation state data and the environment state data among the large number of pieces of state data.

As illustrated in FIG. 6, the boundary curve BC, although having some local distortions, shows an approximately inversely proportional relationship as a whole. That is, as the actual load in the environment state data is smaller, the degree of load tolerance in the operation state data increases, whereas as the actual load in the operation state data is smaller, the degree of load tolerance in the environment state data increases. In the normal operation region defined by the boundary curve BC, point P2 indicates how the motor control system 1 (or the target appliance) is operating in the normal operation state.

At point P1 on the boundary curve BC, the coordinate value of the operation state data is x1 and the coordinate value of the environment state data is y1. Under the assumption that the sum of x1 and y1 (=x1+y1) is approximately constant at any point P1, it can be estimated that the coordinate value sum (=x1+y1) roughly corresponds to the operation rated value. It can also be estimated that at point P2 in the normal operation region, the sum of the coordinate value x2 of the operation state data and the coordinate value y2 of the environment state data roughly corresponds to the operation state value (=x2+y2). That is, in this method of calculation, on the vector plane illustrated in FIG. 6, the operation rated value is a fixed value corresponding to an average of the sums of the loads of the operation state data and the loads of the environment state data constituting a plurality of points P1 on the boundary curve BC. Also on the vector plane illustrated in FIG. 6, the operation state value is a variable corresponding to the sum of the load of the operation state data and the load of the environment state data constituting point P2 in the normal operation region.

In this case, the coordinate value sum of the operation rated value and the coordinate value sum of the operation state value are dimensionless quantities, whose basic units are not based on any physical quantities. A common basic unit may be, for example, the coordinate value at point P0 (=x0+y0), at which the operation state and the environment state are estimated to make the lifetime of the motor control system 1 (or the target appliance) longest. This configuration enables the operation rated value and the operation state value to be compared with each other for arithmetic operation purposes and enables the operation margin to be calculated.

The operation rated value may be other than the above-described coordinate value sum. For example, the operation rated value may be an average of the products of the coordinate values x1 of the operation state data and the coordinate values y1 of the environment state data constituting any points P1 on the boundary curve BC. This is because the coordinate value product (=x1×y1, which is what is called inversely proportional constant) is estimated to be a fixed value. Accordingly, the operation state value may be the product of the coordinate value x2 of the operation state data and the coordinate value y2 of the environment state data constituting any point P2 in the normal operation region (=x2×y2). In this case, the common basic unit is the coordinate value product at point P0 (=x0×y0).

How to Calculate Index Values using Machine Learning

The calculator 36 may include the above-described determiner to calculate, upon detection of the state data, the index values by the above-described arithmetic operations on the vector space. In another possible embodiment, the arithmetic operations are collectively implemented in one machine learning.

Among a wide variety of types of machine learning applicable to setting and calculating the index values, this modification is directed to deep learning applied to a machine learning algorithm.

FIG. 7 illustrates a schematic model configuration of a deep-learning neural network of the calculator 36. Referring to FIG. 7, the neural network of the calculator 36 is designed to analyze a large number of pieces of state data (operation state data, environment state data) input from the sensors 5 and 38 to output an operation state value indicating the operation state of the motor control system 1 (or the target appliance) as of the time of detection of each of the state data.

In the embodiment illustrated in FIG. 7, each piece of state data is input into an input node, and a continuous value is output from the sole output node corresponding to the operation state value (what is called regression output). The processings in the neural network of the calculator 36 are based on a learning content learned in the machine learning process in the learning phase of the calculator 36. Specifically, the learning content learned in the machine learning process includes feature quantities each indicating a correlation (correspondence) between a piece of state data and an operation state.

The multi-layer neural network with the above-described design is mounted in the motor control apparatus 3 or the upper-level controller 2 in the form of software (or hardware). After the multi-layer neural network has been mounted, the machine learning process of the calculator 36 is implemented by what is called supervised learning using a large number of calculator-learning data sets stored in a database, not illustrated. The calculator-learning data sets used in this modification are not illustrated. Each calculator-learning data set is prepared by correlating detection values of each piece of state data with an operation state value calculated in advance using the each piece of state data and the boundary curve BC. Such calculator-learning data set is prepared for various combinations of state data, resulting in a large number of calculator-learning data sets stored in the database.

In the learning phase of the calculator 36 according to this modification, training data consisting of combinations of input data and output data is used. The input data is the state data contained in the calculator-learning data set, while the output data is the operation state contained in the calculator-learning data set. Using the training data, the learning is implemented by processings including what is called backpropagation processing (backwards propagation of errors). The backpropagation processing involves adjusting weight coefficients of the edges connecting the nodes to each other so as to establish relationships between the input layer and the output layer of the neural network of the calculator 36. It will be understood that a wide variety of other known learning methods may be employed in addition to the backpropagation so as to improve processing accuracy.

Examples of the other known learning methods include, but are not limited to, processing using what is called a stacked autoencoder, processing using a restricted Boltzmann machine, dropout processing, noise addition processing, and sparse regularization. The learning phase of the calculator 36 is a non-limiting example of the machine learning process recited in the appended claims.

As described above, the algorithm used in the calculator 36 to determine the index values will not be limited to the above-described algorithm to which deep learning is applied. Other possible examples include, but are not limited to, a machine learning algorithm using a support vector machine and a machine learning algorithm using a Bayesian network. In cases where any of these machine learning algorithms are used, the basic configuration of the neural network of the calculator 36 remains approximately the same. That is, state data is input, the operation state of the motor control system 1 (or the target appliance) resulting from the state data is determined, and the determination is output as determination information.

Advantageous Effects of the Modifications

As has been described hereinbefore, in the motor control system 1 according to the modifications, the calculator 36 calculates an operation state value based on a learning content learned in the machine learning process (deep learning and other kind of machine learning). With this configuration, the calculator 36 calculates the index values, namely, the operation rated value, the operation state value, and the operation margin based on normal state-associated feature quantities obtained from relationships between actual state data obtained by machine learning in the machine learning process, rather than using arithmetic operations based on artificially designed mathematical models. This configuration ensures that these index values are obtained with a level of accuracy that is effective in practical operations.

Also in the modifications, the calculator 36, in the machine learning process, learns correlations between environment state data to be input and operation state values to be output. With this configuration, the calculator 36 serves as a function operator that reflects complicated relationships between a plurality of pieces of state data and index values. Thus, the calculator 36 calculates the index values with improved accuracy.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" mean "approximately identical", "approximately same", "approximately equivalent", and "approximately different", respectively, with design-related and production-related tolerance and error taken into consideration.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A motor control system, comprising:
a motor;
a motor control apparatus including circuitry configured to control feeding of driving power to the motor based on a control command;
an environmental state sensor configured to detect environmental state data of at least one of the motor control apparatus and the motor; and
operation state circuitry configured to determine, based on the environmental state data, an operation margin for an operation state value of at least one of the motor control apparatus and the motor, the operation margin being relative to an operation rated value of at least one of the motor control apparatus and the motor, and to output the determined operation margin,
wherein the operation state circuitry is configured to obtain the operation rated value of at least one of the motor control apparatus and the motor, calculate the operation state value based on the environmental state data, and compare the operation rated value with the operation state value for output of the operation margin.

2. The motor control system according to claim 1, wherein the operation rated value of at least one of the motor control apparatus and the motor is stored in a storage.

3. The motor control system according to claim 2, wherein the operation rated value comprises an index value that ensures a normal state of at least one of the motor control apparatus and the motor.

4. The motor control system according to claim 3, wherein the operation state value comprises an index value that indicates, based on the environmental state data and using a scale of measurement identical to a scale of measurement of the operation rated value, a degree of a load applied at a time of detection of the environmental state data.

5. The motor control system according to claim 3, wherein the operation margin comprises a ratio of the operation state value to the operation rated value.

6. The motor control system according to claim 3, wherein the circuitry of the motor control apparatus includes the operation state circuitry.

7. The motor control system according to claim 2, wherein the operation state value comprises an index value that indicates, based on the environmental state data and using a scale of measurement identical to a scale of measurement of the operation rated value, a degree of a load applied at a time of detection of the environmental state data.

8. The motor control system according to claim 7, wherein the operation margin comprises a ratio of the operation state value to the operation rated value.

9. The motor control system according to claim 7, wherein the circuitry of the motor control apparatus includes the operation state circuitry.

10. The motor control system according to claim 2, wherein the operation state circuitry is configured to calculate the operation state value based on a learning content learned in a machine learning process.

11. The motor control system according to claim 10, wherein in the machine learning process, the operation state circuitry is configured to learn a relationship between the environmental state data and the operation state value.

12. The motor control system according to claim 10, wherein the operation margin comprises a ratio of the operation state value to the operation rated value.

13. The motor control system according to claim 2, wherein the operation margin comprises a ratio of the operation state value to the operation rated value.

14. The motor control system according to claim 2, wherein the circuitry of the motor control apparatus includes the operation state circuitry.

15. The motor control system according to claim 1, wherein the operation margin comprises a ratio of the operation state value to the operation rated value.

16. The motor control system according to claim 15, wherein the circuitry of the motor control apparatus includes the operation state circuitry.

17. The motor control system according to claim 1, wherein the circuitry of the motor control apparatus includes the operation state circuitry.

18. The motor control system according to claim 1, wherein the environmental state data comprises at least one of a component temperature, an external air temperature, an internal atmosphere temperature, humidity, and a vibration value.

19. An apparatus, comprising:
circuitry configured to
obtain environmental state data from an environmental state sensor configured to detect the environmental state data of a motor control apparatus,
determine, based on the obtained environmental state data, an operation margin of an operation state value for the motor control apparatus, the operation margin being relative to an operation rated value of the motor control apparatus, and
output the operation margin to the motor control apparatus such that the motor control apparatus, based on a control command, controls driving power fed to a motor,
wherein the circuitry is configured to obtain the operation rated value of at least one of the motor control apparatus and the motor, calculate the operation state value based on the environmental state data, and compare the operation rated value with the operation state value for output of the operation margin.

20. A method for controlling a motor, comprising:
detecting environmental state data of a motor control apparatus;
determining, based on the environmental state data, an operation margin of an operation state value for the motor control apparatus, the operation margin being relative to an operation rated value of the motor control apparatus; and
outputting the operation margin to the motor control apparatus such that the motor control apparatus, based on a control command, controls driving power fed to the motor,
wherein the method further comprises obtaining the operation rated value of at least one of the motor control apparatus and the motor, calculating the operation state value based on the environmental state data, and comparing the operation rated value with the operation state value for output of the operation margin.

* * * * *